US008843916B2

(12) United States Patent
Luan (10) Patent No.: US 8,843,916 B2
(45) Date of Patent: Sep. 23, 2014

(54) METHOD AND SYSTEM FOR OBTAINING A DYNAMIC UPDATE IN INSTANT MESSAGING SOFTWARE AND COMPUTER STORAGE MEDIUM THEREFOR

(71) Applicant: Tao Luan, Guangdong (CN)

(72) Inventor: Tao Luan, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/672,509

(22) Filed: Nov. 8, 2012

(65) Prior Publication Data

US 2013/0067453 A1 Mar. 14, 2013

Related U.S. Application Data

(63) Continuation of application No. PCT/CN2011/077262, filed on Jul. 18, 2011.

(30) Foreign Application Priority Data

Aug. 2, 2010 (CN) .......................... 2010 1 0243021

(51) Int. Cl.
*G06F 9/44* (2006.01)
*H04L 12/58* (2006.01)
*H04W 4/00* (2009.01)

(52) U.S. Cl.
CPC .............. *H04L 12/581* (2013.01); *H04L 51/38* (2013.01); *H04L 12/5895* (2013.01); *H04W 4/001* (2013.01); *H04L 51/04* (2013.01)
USPC ........................................................ 717/172

(58) Field of Classification Search
CPC ...................................................... H04L 12/58

USPC .................................................. 717/168–178
See application file for complete search history.

(56) References Cited

U.S. PATENT DOCUMENTS

2007/0244739 A1* 10/2007 Soito et al. ...................... 705/10

FOREIGN PATENT DOCUMENTS

CN 101247362 A 8/2008
CN 101355528 A 1/2009

(Continued)

OTHER PUBLICATIONS

Cisco, "User Guide for Cisco Security MARS Local Controller", May 2007, Cisco Systems, Inc., 594 pages.*

(Continued)

*Primary Examiner* — Ted T Vo
(74) *Attorney, Agent, or Firm* — Tim Tingkang Xia, Esq.; Morris, Manning & Martin, LLP (57) ABSTRACT

A method, system and a non-transitory computer storage medium for obtaining a dynamic update in instant messaging software. The method includes obtaining update manner modification parameters and real-time user interaction data; generating a corresponding update manner according to the update manner modification parameters and the real-time user interaction data; and obtaining corresponding updated information according to the update manner. With the above-mentioned steps, according to the habit of a user, the update manner of the dynamic modification allows the updated information to be obtained in a timely manner and reduce the pressure on bandwidth. It results in a balance between the bandwidth cost and the timeliness, which greatly saves the network bandwidth and improves the experience of user.

15 Claims, 3 Drawing Sheets

(56) References Cited

FOREIGN PATENT DOCUMENTS

EP      1962473 A1    8/2008
JP      2007257671 A  10/2007
JP      2008186157 A  8/2008

OTHER PUBLICATIONS

State Intellectual Property Office of the People's Republic of China (ISA/CN), "International Search Report", issued for PCT/CN2011/077262 by Tencent Technology (Shenzhen) Company Limited, China, Oct. 27, 2011.

State Intellectual Property Office of the People's Republic of China (ISA/CN), "Written Opinion of the International Searching Authority", issued for PCT/CN2011/077262 by Tencent Technology (Shenzhen) Company Limited, China, Oct. 27, 2011.

The International Bureau of WIPO, "International Preliminary Report on Patentability", issued for PCT/CN2011/077262 by Tencent Technology (Shenzhen) Company Limited, Switzerland, Feb. 5, 2013.

* cited by examiner

METHOD AND SYSTEM FOR OBTAINING A DYNAMIC UPDATE IN INSTANT MESSAGING SOFTWARE AND COMPUTER STORAGE MEDIUM THEREFOR

CROSS-REFERENCE TO RELATED APPLICATIONS

This application is a continuation application of International Patent Application No. PCT/CN2011/077262 filed Jul. 18, 2011, entitled "METHOD AND SYSTEM FOR DYNAMIC UPDATE IN INSTANT MESSAGING SOFTWARE, AND STORAGE MEDIUM", by Tao Luan, which itself claims the priority to Chinese Patent Application No. 201010243021.8, filed Aug. 2, 2010 entitled "METHOD AND SYSTEM FOR DYNAMIC UPDATE IN INSTANT MESSAGING SOFTWARE", by Tao Luan, the disclosures for which are hereby incorporated herein in their entireties by reference.

FIELD OF THE INVENTION

The present invention relates generally to the field of instant messaging, and more particularly, to a method and system for obtaining a dynamic update in instant messaging software, and a non-transitory computer storage medium for controlling a computer to execute the method of the same.

BACKGROUND OF THE INVENTION

With the development of instant messaging (IM), the IM has been widely accepted by most internet users, and has become an indispensable tool not only in daily entertainment but also at work. Therefore, more demanding requirements on usability, reliability, security, and many other areas are introduced by users. There are various types of information in an instant messaging software, and users pay attention to certain information differently. For example, if information about friends in SNS community is updated, only some of the users are interested about this update. Such update does not necessarily need to be updated instantly.

Conventionally, there are two solutions for pulling the updated information. First, updated information is pulled from the server when the client side logs in. With this solution, once the user logs in, the client side will not be able to update newly added information after logging in, which greatly affects the user experience. Second, the updated information is regularly pulled from the server by the client side. In this second solution, it is difficult to set the time interval for updating information, as it varies according to different user needs. Some of the users may not care about certain data, but the updated information is pulled for too many times which consumes internet bandwidth, while some other users who may care about this data may not receive the updated information in a timely manner.

Therefore, a heretofore unaddressed need exists in the art to address the aforementioned deficiencies and inadequacies.

SUMMARY OF THE INVENTION

In one aspect, the present invention is directed to a method for obtaining a dynamic update in instant messaging software that can obtain updated information in a timely manner while reduce the pressure on bandwidth.

In one embodiment, a method for obtaining a dynamic update in instant messaging software comprises:

obtaining update manner modification parameters and real-time user interaction data;

generating a corresponding update manner according to the update manner modification parameters and the real-time user interaction data; and obtaining corresponding updated information according to the update manner.

In one embodiment, before obtaining the update manner modification parameters and the real-time user interaction data, the method further comprises establishing a table of update manner modification parameters.

In one embodiment, the update manner modification parameters have at least a first pulling time, a default pulling time interval, a quantity of user interaction, a stimulus level of user interaction to time interval and a minimum pulling time interval.

In one embodiment, the generating of the corresponding update manner according to the update manner modification parameters and the real-time user interaction data includes:

obtaining a pulling time interval when the first pulling time is determined to be an immediate pulling; and determining whether the pulling time interval obtained is smaller than the minimum pulling time interval. If yes, generating the corresponding update manner according to the minimum puling time interval, otherwise, generating the corresponding update manner according to the pulling time interval obtained.

In one embodiment, the obtaining of the pulling time interval includes: obtaining a product of the quantity of user interaction and the stimulus level of user interaction to time interval, then obtaining a difference between the default pulling time interval and the product, and setting the difference to be the pulling time interval.

In one embodiment, after obtaining the corresponding updated information according to the update manner, the method further comprises obtaining real-time user interaction data, increasing the quantity of user interaction, and returning to obtaining the pulling time interval.

In one embodiment, the method further comprises obtaining real-time user interaction data, increasing the quantity of user interaction, and returning to obtaining the pulling time interval, when the first pulling time is determined not to be an immediate pulling.

In another aspect, the present invention is directed to a system for obtaining a dynamic update in instant messaging software that can obtain the updated information in a timely manner while reduce the pressure on bandwidth.

In one embodiment, a system for obtaining a dynamic update in instant messaging software includes:

an information obtaining module, configured to obtain update manner modification parameters and real-time user interaction data;

an update manner establishing module, configured to generate a corresponding update manner according to the update manner modification parameters and the real-time user interaction data; and an update module, configured to obtain corresponding updated information according to the update manner.

In one embodiment, the system further includes a creation module configured to establish a table of update manner modification parameters.

In one embodiment, the update manner modification parameters include at least a first pulling time, a default pulling time interval, a quantity of user interaction, a stimulus level of user interaction to time interval and a minimum pulling time interval.

In one embodiment, the update manner establishing module includes a determination module, a processing module, and a generation module. The determination module is configured to determine whether the first pulling time is an immediate pulling. The processing module is configured to obtain the pulling time interval when the first pulling time is determined to be an immediate pulling. The determination module is further configured to determine whether the pulling time interval obtained is smaller than the minimum puling time interval. If so, a corresponding update manner is generated by the generation module according to the minimum puling time interval. Otherwise, a corresponding update manner is generated by the generation module according to the pulling time interval obtained.

In one embodiment, the processing module is further configured to obtain a product of the quantity of user interaction and the stimulus level of user interaction to time interval, then obtain a difference between the default pulling time interval and the product, and set the difference to be the pulling time interval.

In one embodiment, after the update module obtains the corresponding updated information according to the update manner, the information obtaining module is further configured to obtain the real-time user interaction data, increase the quantity of user interaction, and the processing module is configured to obtain the pulling time interval.

In one embodiment, when the first pulling time is determined not to be an immediate pulling, the information obtaining module is configured to obtain the real-time user interaction data, increase the quantity of user interaction, and the processing module is configured to obtain the pulling time interval.

In a further aspect, the present invention is directed to a non-transitory computer storage medium that can obtain updated information in a timely manner while reduce the pressure on bandwidth.

In one embodiment, the non-transitory computer storage medium having computer executable instructions stored thereupon which, when executed by a computer, cause the computer to execute a method for obtaining a dynamic update in instant messaging software. The method comprises:
  obtaining update manner modification parameters and real-time user interaction data;
  generating a corresponding update manner according to the update manner modification parameters and the real-time user interaction data; and
  obtaining corresponding updated information according to the update manner.

In one embodiment, before obtaining the update manner modification parameters and the real-time user interaction data, the method further includes establishing a table of update manner modification parameters.

In one embodiment, the update manner modification parameters have at least a first pulling time, a default pulling time interval, a quantity of user interaction, a stimulus level of user interaction to time interval and a minimum pulling time interval.

In one embodiment, generating the corresponding update manner according to the update manner modification parameters and the real-time user interaction data comprises:
  obtaining a pulling time interval when the first pulling time is determined to be an immediate pulling; and
  determining whether the pulling time interval obtained is smaller than the minimum pulling time interval; if yes, generating the corresponding update manner according to the minimum puling time interval, otherwise, generating the corresponding update manner according to the pulling time interval obtained.

In one embodiment, the obtaining of the pulling time interval includes: obtaining a product of the quantity of user interaction and the stimulus level of user interaction to time interval, then obtaining a difference between the default pulling time interval and the product, and setting the difference to be the pulling time interval.

In one embodiment, after obtaining the corresponding updated information according to the update manner, the method further comprises obtaining real-time user interaction data, increasing the quantity of user interaction, and returning to obtaining the pulling time interval.

In one embodiment, the method further comprises obtaining real-time user interaction data, increasing the quantity of user interaction, and returning to obtaining the pulling time interval, when the first pulling time is determined not to be an immediate pulling.

As described above, the method and system for obtaining a dynamic update in instant messaging software, and the non-transitory computer storage medium for storing computer-executable instructions thereof, among other things, executes the method of obtaining update manner modification parameters and real-time user interaction data, generating a corresponding update manner according to the update manner modification parameters and the real-time user interaction data, and then obtaining corresponding updated information according to the update manner. In this way, according to the habit of a user, the update manner of the dynamic modification allow information to be updated in a timely manner while reduce the pressure on bandwidth. Furthermore, it achieves a balance between the bandwidth cost for information obtained and the timeliness of information updating, which greatly saves the network bandwidth and improves user experience.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DESCRIPTION OF THE PREFERRED EMBODIMENTS

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

Figure 1:
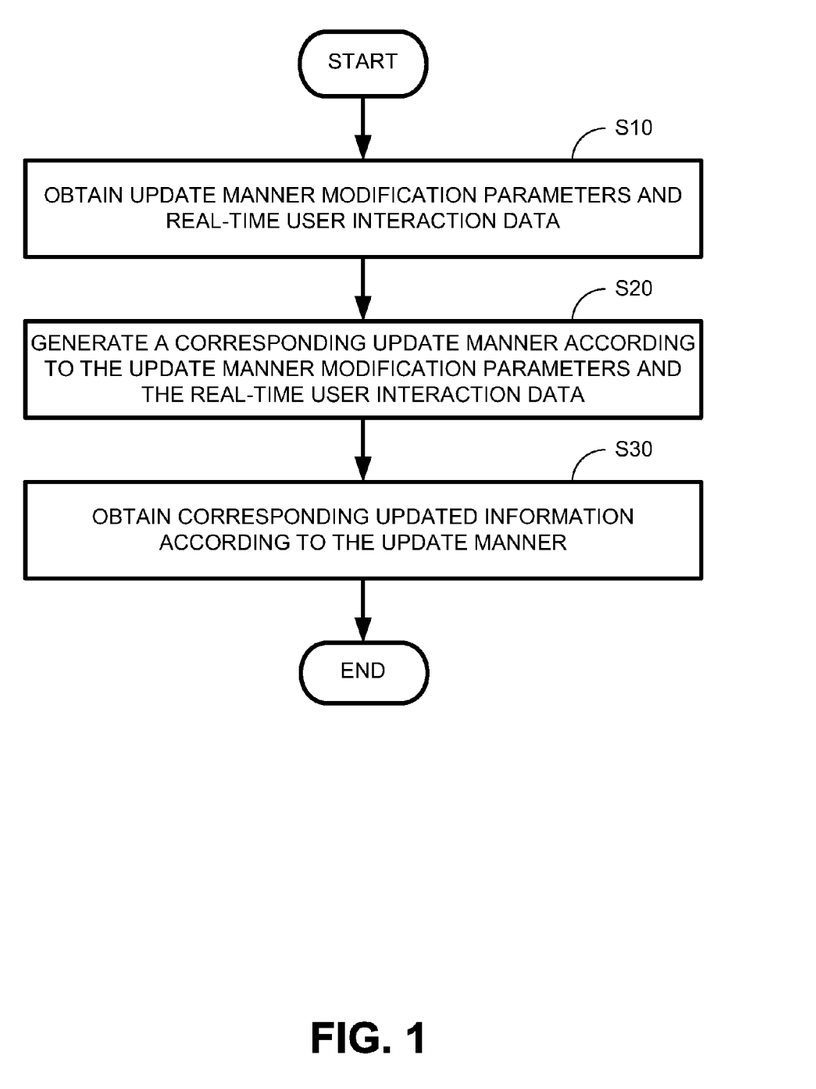
FIG. 1 is a flowchart of a method for obtaining a dynamic update in instant messaging software according to one embodiment of the present invention.

Referring to FIG. 1, a method for obtaining a dynamic update in instant messaging software includes following steps:

Step S10: obtain update manner modification parameters and real-time user interaction data. For an information data, a series of parameters, such as update manner modification parameters, is required to obtain its dynamic update. The update manner modification parameters are associated with the update algorithm. The update manner modification parameters include but not limited to the followings: a first pulling time, a default pulling time interval, a quantity of user interaction, a stimulus level of user interaction to time interval, a minimum pulling time interval.

The first pulling time refers to the time-related objective condition of the client side to obtain the dynamic update information from a server for the first time. For example, an immediate pulling represents that the time when the user logs in the client side is the first pulling time. On the other hand, for a regular pulling, for example the update information is pulled from the server once every three minutes. That is, three minutes after the user logs in the client side is the first pulling time. The first pulling time may also be a time when the user clicks on the information. The first pulling time is preset by the system. The default pulling time interval is set by the system. The quantity of user interaction refers to the times of interaction between the user and the client side, such as the times of the user to click on a button. In addition, this embodiment utilizes the interaction module of the user clicking on the button. However, the interaction module may be different depending on different products. For example, it may be an interaction module of the user entering commands through a keyboard.

The stimulus level of user interaction to time interval is a regulation of the pulling time interval after the interaction between the user and the client side, that is, it will affect the pulling time interval after the interaction between the user and the client side. The stimulus level may be set by using weighting method. The minimum pulling time interval is a minimum time interval for updating change data set by the system, and it is set by taking consideration of the conditions such as different area, different bandwidth, and different degree of concern. Except the quantity of user interaction, other update manner modification parameters are all preset by the system. Moreover, for different information data, each data has a specific parameter combination.

In an embodiment, before the step S10, the method further includes a step of establishing a table of update manner modification parameters. The table of update manner modification parameters is established according to different parameter combinations of different information, and stored in the server side. When the client side is updating, the table of update manner modification parameters is first obtained from the server side to obtain the corresponding update manner modification parameters. The table of update manner modification parameters is a form of gathering the update manner modification parameters. However, it is not limited to this form.

Step S20: a corresponding update manner is generated according to the update manner modification parameters and the real-time user interaction data. The update manner of certain information is dynamically determined according the data such as the update manner modification parameters and the user interaction data, and the related timer is started to update regularly.

Step S30: obtain the corresponding update information according to the update manner. The corresponding update information is pulled directly from the server side according to the update manner after the corresponding update manner is established according to the update parameters and the user interaction data.

In an embodiment, after the step S30, the method further includes obtaining real-time user interaction data, increasing the quantity of user, and returning to the step S201.

Figure 2:
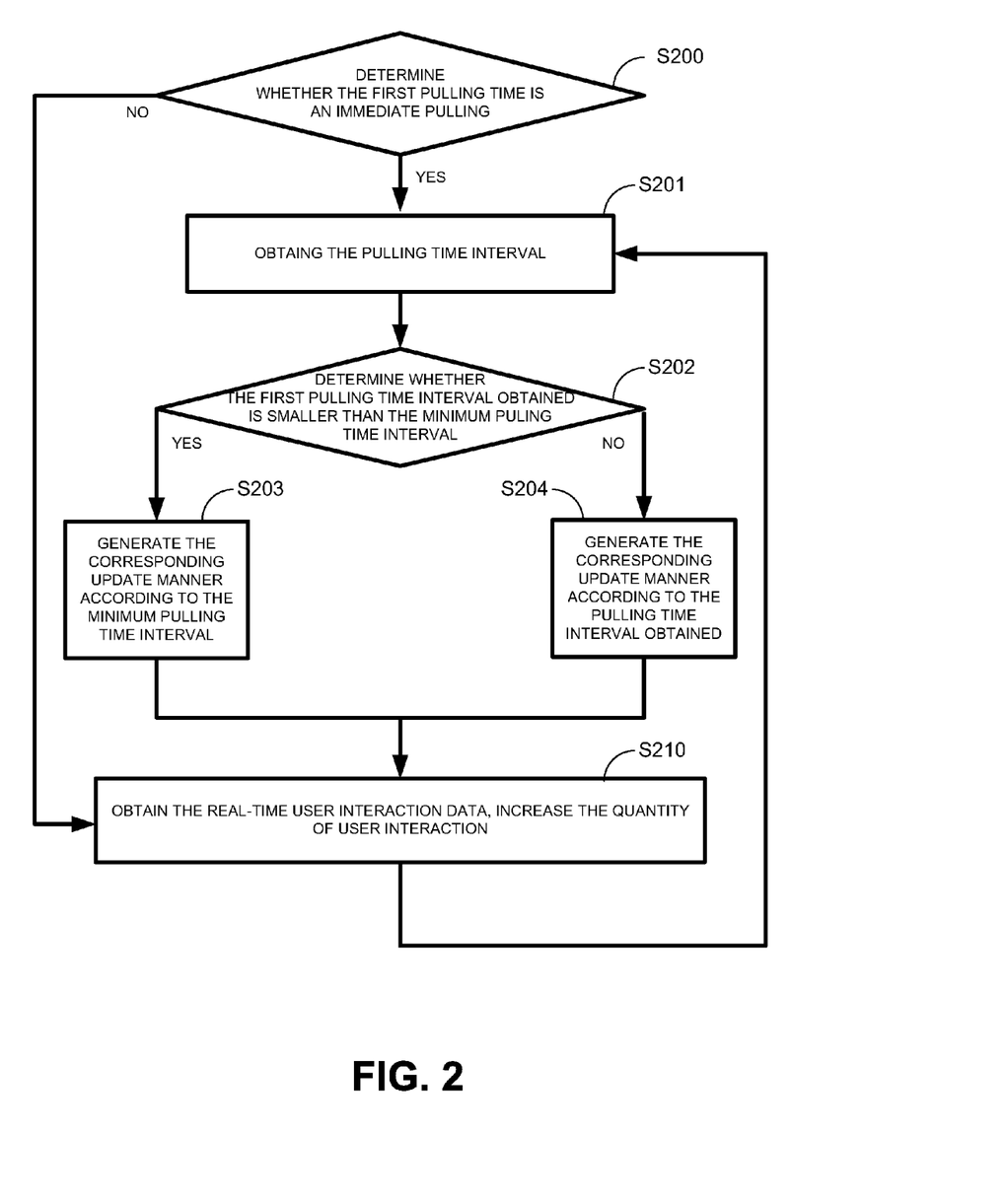
FIG. 2 is a flowchart of a method of generating a corresponding update manner based on update manner modification parameters and real-time user interaction data according to one embodiment of the present invention.

In one embodiment, as shown in FIG. 2, the step S20 includes the following:

Step S200: determine whether the first pulling time is an immediate pulling. If so, then proceed to the step S201, otherwise, proceed to the step S210.

Step S201: obtain the pulling time interval. In one embodiment, the specific steps are as follows: the pulling time interval is set to the difference between the default pulling time interval and the product of the quantity of user interaction and the stimulus level of user interaction to time interval. When the first pulling time is determined to be an immediate pulling, a product of the quantity of user interaction and the stimulus level of user interaction to time interval is obtained, that is, obtain the effect of the interaction between the user and the client side to the pulling time interval, then obtain a difference between the default pulling time interval and the product. The difference is set to be the pulling time interval.

Step S202: determine whether the pulling time interval obtained is smaller than the minimum pulling time interval. If yes, then proceed to the step S203, otherwise, proceed to the step S204. The pulling time interval obtained may be smaller than the minimum pulling time interval set by the system, and if the pulling time interval obtained is smaller than the minimum pulling time interval set by the system, then excessive information updates by the system will negatively impact the network speed as well as take additional memory. It is necessary to get the update information regularly according to the minimum pulling time interval.

Step S203: generate a corresponding update manner according to the minimum pulling time interval. If the pulling time interval obtained is smaller than the minimum pulling time interval, then the minimum pulling time is set to the timer to allow the update information to be pulled from the server regularly according to the minimum pulling time interval, that is, the finally established pulling time interval is the minimum pulling time interval, such that a proper pulling time interval is obtained to reduce the pressure on the bandwidth and achieve a better network utilization.

Step S204: a corresponding update manner is generated according to the pulling time interval obtained. If the pulling time interval obtained is not smaller than the minimum pulling time interval, then the pulling time interval obtained is set directly to the timer, and the updated information is pulled from the server regularly according to the pulling time interval obtained. If the pulling time interval obtained is 5 minutes, and the minimum pulling time interval set by the system is 3 minutes, then the update manner that the client side gets the update information from the server once every 5 minutes is generated.

Step S210: obtain the real-time user interaction data, increase the quantity of user interaction, and return to the step S201. When the first pulling time is determined not to be an immediate pulling, it represents that the user does not pay too much attention to the updated information. Therefore, it is unnecessary to establish an update manner immediately, and the update manner may not be established until the interaction data of the user is obtained when the user interacts with the client side. If the user clicks on this information, it represents that the user starts to pay attention to the information. When the click times of the user increase, it represents that the user pays more attention to such information, and it is necessary to establish the corresponding update manner, and proceed to the step S201 to step S204 to constitute the new pulling time interval for updating so as to cater to the user's needs and require the information to be updated in a timely manner.

The above solution for generating the update matter is an algorithm with the input of the update manner modification parameters and the user interaction data, and the output of the pulling time interval. This algorithm is only illustrated here as one embodiment, and the present invention is not limited to this embodiment.

In one embodiment, after the step S30, the method further includes the steps of (1) obtaining real-time user interaction data, (2) increasing the quantity of user, and (3) returning to the step S201. As shown in FIG. 2, this step may be immediately after the step S204, to obtain the real-time user interaction data, increase the quantity of user, and return to the step S201 to reestablish the pulling time interval. After the corresponding dynamic update information is obtained according to the pulling time interval, the user proceeds with the interaction, the quantity of user interaction increases and needs to be updated, then a new pulling time interval is reestablished according to the quantity of user interaction, the default pulling time interval and the stimulus level of user interaction to time interval, and then repeat the steps S201 to S204 to reestablish the pulling time interval. In this way, the more the quantity of user interaction, the higher the timeliness of the update information requested by the user, and the shorter the reestablished pulling time interval, but not smaller than the minimum time interval. With this dynamic establishment of update manner, the information concerned by the user is updated in a more timely manner, which caters to user's needs and improves user's experience.

In another embodiment, a non-transitory computer storage medium having computer-executable instructions stored thereupon which, when executed by a computer, cause the computer to execute a method for obtaining a dynamic update in instant messaging software. The method may be the method as disclosed and discussed above.

Figure 3:
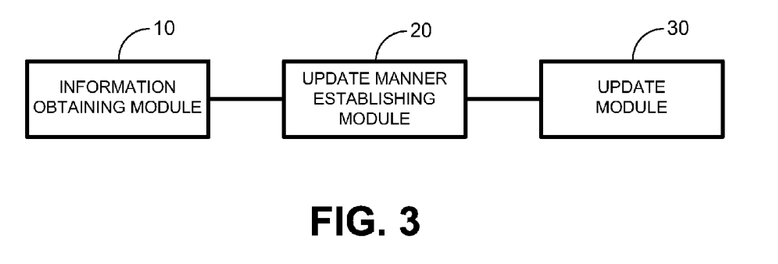
FIG. 3 illustrates a block diagram structure chart of a system for obtaining a dynamic update in instant messaging software according to one embodiment of the present invention.

In one embodiment as shown in FIG. 3, a system for obtaining a dynamic update in instant messaging software includes an information obtaining module 10, a update manner establishing module 20 and a update module 30. The information obtaining module 10 is configured to obtain update manner modification parameters and real-time user interaction data. The update manner establishing module 20 is configured to generate a corresponding update manner according to the update manner modification parameters and the real-time user interaction data. The update module 30 is configured to obtain the corresponding updated information according to the update manner. The update manner establishing module 20 determines the update manner of certain information according to the update manner modification parameters and the real-time user interaction data, and start the relevant timer to instruct the update module 30 to update regularly. The update manner modification parameters include but not limited to the followings: a first pulling time, a default pulling time interval, a quantity of user interaction, a stimulus level of user interaction to time interval, a minimum pulling time interval. These parameters have been described in the method discussed above.

Figure 4:
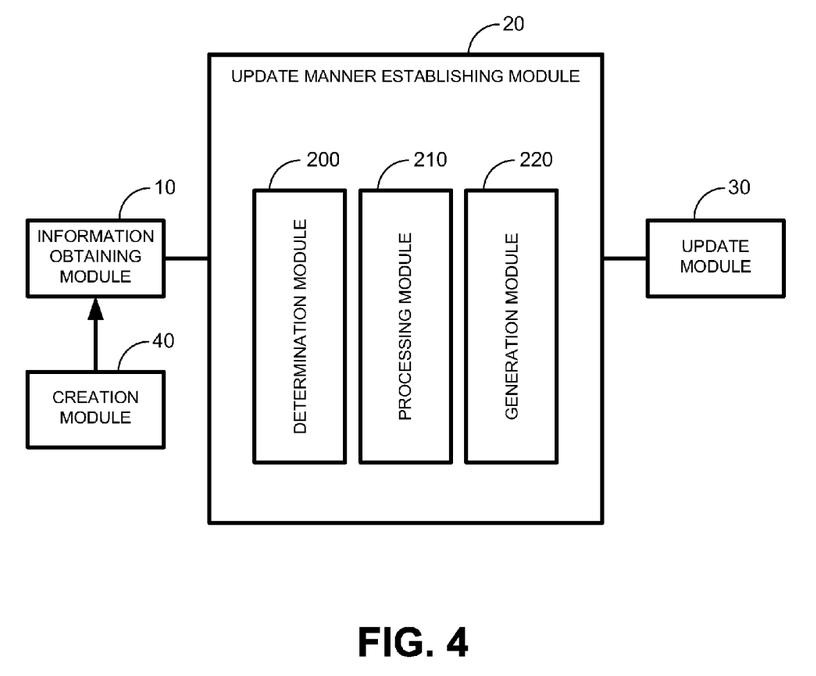
FIG. 4 illustrates a more detailed block diagram of structure of a system for obtaining a dynamic update in instant messaging software according to one embodiment of the present invention.

In one embodiment, as shown in FIG. 4, the above system further includes a creation module 40 configured to establish the table of update manner modification parameters. The table of update manner modification parameters for different information update manners is established in the creation module 40. This table is saved in the server side, and can be obtained by the client side directly from the server by pulling. The information obtaining module 10 obtains the update manner from the table of update manner modification parameters.

In an embodiment, as shown in FIG. 4, the update manner establishing module 20 includes a determination module 200, a processing module 210 and a generation module 220. The processing module 210 obtains the pulling time interval when the first pulling time is determined by the determination module 200 to be an immediate pulling. In one embodiment, the processing module 210 calculates the difference between the default pulling time interval and the product of the quantity of user interaction and the stimulus level of user interaction to time interval, and the difference is set to be the pulling time interval. When the determination module 200 determines that the first pulling time is an immediate pulling, the processing module 210 obtains the product of the quantity of user interaction and the stimulus level of user interaction to time interval, that is, the effect of the interaction between the user and the client side to the pulling time interval is obtained, then obtain the difference between the product and the default pulling time interval, and the difference is set to be the pulling time interval. The determination module 200 further determines whether the pulling time interval obtained is smaller than the minimum puling time interval; if yes, then the generation module 220 generates a corresponding update manner according to the minimum puling time interval, otherwise, the generation module 210 generates a corresponding update manner according to the pulling time interval obtained. The pulling time interval obtained may be smaller than the minimum pulling time interval set by the system, and if the pulling time interval obtained is smaller than the minimum pulling time interval set by the system, then excessive information updates by the system will negatively impact the network speed as well as take additional memory. It is necessary to get the update information regularly according to the minimum pulling time interval. If the pulling time interval obtained is smaller than the minimum pulling time interval, then the minimum pulling time is set to the timer to get the update information from the server regularly according to the minimum pulling time interval, such that a proper pulling time interval is obtained to reduce the pressure on the bandwidth and achieve a better network utilization. If the pulling time interval obtained is not smaller than the minimum pulling time interval, then the pulling time interval obtained is directly set to the timer, and the update information is pulled from the server regularly according to the pulling time interval obtained. If the pulling time interval obtained is 5 minutes, and the minimum pulling time interval set by the system is 3 minutes, then the generation module 220 generates a update manner that the client side gets the update information from the server side once every 5 minutes.

In one embodiment, the update module 30 obtains the corresponding updated information according to the update manner, the information obtaining module 10 further obtains real-time user interaction data, increases the quantity of user interactions, and the processing module 210 recalculates to obtain the pulling time interval. In this embodiment, the details are as follows: recalculates the difference between the default pulling time interval and the product of the quantity of user interaction and the stimulus level of user interaction to time interval, and the difference is set to be the pulling time interval. After the update module 30 obtains the corresponding update information according to the pulling time interval, the user proceeds with the interaction, the quantity of user interaction increases and needs to be updated, then a new pulling time interval is reestablished according to the quantity of user interaction, the default pulling time interval and the stimulus level of user interaction to time interval. The determination module 200 determines whether the pulling time interval newly obtained is smaller than the minimum pulling time interval, and the generation module 220 again generates the new update according to the determination results. In this way, the more the quantity of user interaction, the higher the timeliness of the update information required by the user, and the shorter the reestablished pulling time interval, but not smaller than the minimum time interval. With this dynamic establishment of update manner, the information concerned by the user is updated in a timely manner, which caters for the needs of user and improves the experience of user.

In this embodiment, when the first pulling time is determined not to be an immediate pulling by the determination module 200, the information obtaining module 10 obtains the real-time user interaction data, increases the quantity of user interaction, and the processing module 210 obtains the pulling time interval. The details are as follows: the processing module 210 obtains the difference between the default pulling time interval and the product of the quantity of user interaction and the stimulus level of user interaction to time interval, and the difference is set to be the pulling time interval. Then, the determination module 200 determines whether the pulling time interval obtained is smaller than the minimum pulling time interval, and the generation module 220 generates the corresponding update manner according to the determination results. When the first pulling time is determined not to be an immediate pulling, it represents that the user does not pay high attention to the update information, it is unnecessary to establish an update manner immediately, and the update manner may not be established until the interaction data of the user is obtained when the user interact with the client side. If the user clicks on this information, it represents that the user starts to pay attention to the information. When the click times of the user increase, it represents that the user pays more attention to the information, and it is thus necessary to establish the corresponding update manner to update the information in a timely manner and to cater for the needs of the user.

As described above, the method, the system and the non-transitory computer storage medium for obtaining a dynamic update in instant messaging software, among other things, executes the method of obtaining update manner modification parameters and real-time user interaction data, generating a corresponding update manner according to the update manner modification parameters and the real-time user interaction data, and then obtaining corresponding updated information according to the update manner. In this way, according to the habit of a user, the update manner of the dynamic modification to obtain the update information can obtain the update information in a timely manner and reduce the pressure on bandwidth at the same time. Furthermore, it achieves a balance between the bandwidth cost of information obtaining and the timeliness of information updating, which greatly saves the network bandwidth and improves the experience of user.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for obtaining a dynamic update in an instant messaging software executed on a client-server computer system, comprising:
   obtaining update manner modification parameters and real-time user interaction data;
   generating a corresponding update manner according to the update manner modification parameters and the real-time user interaction data; and
   obtaining corresponding updated information according to the update manner,
   wherein the update manner modification parameters comprise a first pulling time for a client to obtain the dynamic update from a server, a default pulling time interval, a quantity of user interaction with the client, a stimulus level of user interaction to time interval and a minimum pulling time interval;
   the generating of the corresponding update manner according to the update manner modification parameters and the real-time user interaction data comprises:
   obtaining a pulling time interval when the first pulling time is determined to be an immediate pulling;
   when the pulling time interval obtained is smaller than the minimum pulling time interval, generating a corresponding update manner according to the minimum pulling time interval;
   when the pulling time interval obtained is greater than the minimum pulling time interval, generating a corresponding update manner according to the pulling time interval obtained.

2. The method of claim 1, before obtaining the update manner modification parameters and the real-time user interaction data, further comprising establishing a table of update manner modification parameters.

3. The method of claim 1, wherein the obtaining of the pulling time interval comprises:
   obtaining a product of the quantity of user interaction and the stimulus level of user interaction to time interval,
   obtaining a difference between the default pulling time interval and the product, and
   setting the difference to be the pulling time interval.

4. The method of claim 1, after obtaining the corresponding updated information according to the update manner, further comprising:

obtaining real-time user interaction data;
increasing the quantity of user interaction; and
returning to obtaining the pulling time interval.

5. The method of claim 1, when the first pulling time is determined not to be an immediate pulling, further comprising:
obtaining real-time user interaction data;
increasing the quantity of user interaction; and
returning to obtaining the pulling time interval.

6. A system for obtaining a dynamic update in an instant messaging software executed on a client-server computer system, comprising a computer storing:
an information obtaining module, configured to obtain update manner modification parameters and real-time user interaction data;
an update manner establishing module, configured to generate a corresponding update manner according to the update manner modification parameters and the real-time user interaction data; and
an update module, configured to obtain corresponding updated information according to the update manner,
wherein the update manner-modification parameters comprise a first pulling time for a client to obtain the dynamic update from a server, a default pulling time interval, a quantity of user interaction with the client, a stimulus level of user interaction to time interval and a minimum pulling time interval;
the establishing module comprises:
a determination module configured to determine whether the first pulling time is an immediate pulling;
a processing module configured to obtain a pulling time interval when the first pulling time is determined to be an immediate pulling, and
a generation module configured to generate a corresponding update manner according to the minimum pulling time interval if the pulling time interval obtained is determined by the determination module to be smaller than the minimum puling time interval, or to generate a corresponding update manner according to the pulling time interval obtained if the pulling time interval obtained is determined by the determination module to be greater than the minimum pulling time interval.

7. The system of claim 6, further comprising a creation module configured to establish a table of update manner modification parameters.

8. The system of claim 6, wherein the processing module is further configured to obtain a product of the quantity of user interaction and the stimulus level of user interaction to time interval, obtain a difference between the default pulling time interval and the product, and set the difference to be the pulling time interval.

9. The system of claim 6, wherein after the update module obtains the corresponding updated information according to the update manner, the information obtaining module is further configured to obtain real-time user interaction data, increase the quantity of user interaction, and the processing module is configured to obtain the pulling time interval.

10. The system of claim 6, wherein when the first pulling time is determined not to be an immediate pulling, the information obtaining module is configured to obtain real-time user interaction data, increase the quantity of user interaction, and the processing module is configured to obtain the pulling time interval.

11. A non-transitory computer storage medium having computer-executable instructions stored thereupon which, when executed by a computer, cause the computer to execute a method for obtaining a dynamic update in an instant messaging software executed on a client-server computer system, wherein the method comprises:
obtaining update manner modification parameters and real-time user interaction data;
generating a corresponding update manner according to the update manner modification parameters and the real-time user interaction data; and
obtaining corresponding updated information according to the update manner,
wherein the update manner modification parameters comprise a first pulling time for a client to obtain the dynamic update from a server, a default pulling time interval, a quantity of user interaction with the client, a stimulus level of user interaction to time interval and a minimum pulling time interval;
the generating of the corresponding update manner according to the update manner modification parameters and the real-time user interaction data comprises:
obtaining a pulling time interval when the first pulling time is determined to be an immediate pulling;
when the pulling time interval obtained is smaller than the minimum pulling time interval, generating a corresponding update manner according to the minimum puling time interval;
when the pulling time interval obtained is greater than the minimum pulling time interval, generating a corresponding update manner according to the pulling time interval obtained.

12. The non-transitory computer storage medium of claim 11, wherein before obtaining the update manner modification parameters and the real-time user interaction data, the method further comprises establishing a table of update manner modification parameters.

13. The non-transitory computer storage medium of claim 11, wherein the obtaining of the pulling time interval comprises:
obtaining a product of the quantity of user interaction and the stimulus level of user interaction to time interval;
obtaining a difference between the default pulling time interval and the product; and
setting the difference to be the pulling time interval.

14. The non-transitory computer storage medium of claim 11, wherein after obtaining the corresponding updated information according to the update manner, the method further comprises:
obtaining real-time user interaction data;
increasing the quantity of user interaction; and
returning to obtaining the pulling time interval.

15. The non-transitory computer storage medium of claim 11, wherein when the first pulling time is determined not to be an immediate pulling, the method further comprises:
obtaining real-time user interaction data;
increasing the quantity of user interaction; and
returning to obtaining the pulling time interval.

* * * * *